United States Patent
Imhoff

(10) Patent No.: US 11,977,170 B2
(45) Date of Patent: May 7, 2024

(54) ANTENNA STEERING-INDUCED PHASE CENTER ERROR LIMITER

(71) Applicant: Raytheon Company, Tewksbury, MA (US)

(72) Inventor: Scott Allen Imhoff, Parker, CO (US)

(73) Assignee: Raytheon Company, Tewksbury, MA (US)

(*) Notice: Subject to any disclaimer, the term of this patent is extended or adjusted under 35 U.S.C. 154(b) by 153 days.

(21) Appl. No.: 17/493,461

(22) Filed: Oct. 4, 2021

(65) Prior Publication Data

US 2023/0107068 A1  Apr. 6, 2023

(51) Int. Cl.
*G01S 19/07* (2010.01)
*G01S 19/40* (2010.01)
*B64G 1/66* (2006.01)
*H04B 7/185* (2006.01)

(52) U.S. Cl.
CPC .............. *G01S 19/07* (2013.01); *G01S 19/40* (2013.01); *B64G 1/66* (2013.01); *H04B 7/18513* (2013.01)

(58) Field of Classification Search
CPC ........... G01S 19/07; G01S 19/40; H01Q 3/00; B64G 1/66; H04B 7/18513

USPC ................ 342/357.44, 357.23, 368, 350
See application file for complete search history.

(56) References Cited

U.S. PATENT DOCUMENTS

| | | | |
|---|---|---|---|
| 8,085,196 B2 | 12/2011 | Whitehead | |
| 8,890,757 B1* | 11/2014 | Macy | H01Q 19/04 |
| | | | 343/766 |
| 10,222,481 B1* | 3/2019 | Heinrich | G01S 19/40 |
| 10,483,629 B1* | 11/2019 | Silva | H01Q 3/2605 |
| 10,884,094 B2* | 1/2021 | Johnson | H01Q 3/08 |
| 2016/0327686 A1* | 11/2016 | Martin-Neira | G01W 1/00 |

* cited by examiner

*Primary Examiner* — Chuong P Nguyen
(74) *Attorney, Agent, or Firm* — Schwegman Lundberg & Woessner, P.A.

(57) ABSTRACT

Systems, devices, methods, and computer-readable media for location determination of an orbiting device. A method can include receiving measurement data from a monitor device, the measurement data representative of a position of an orbiting space object with a mechanically moveable antenna, receiving, by processor circuitry, mission data indicating orientation of the antenna is changing from a first orientation to a second, different orientation by a specified time, determining, based on the mission data, an inter-signal correction (ISC), applying the determined ISC to the measurement data resulting in corrected measurement data, providing the corrected measurement data to a Kalman filter, and receiving, from the Kalman filter, a position estimate of the orbiting space object.

20 Claims, 7 Drawing Sheets

ANTENNA STEERING-INDUCED PHASE CENTER ERROR LIMITER

GOVERNMENT RIGHTS

This invention was made with United States government support under contract FA8807-21-C-0002. The government has certain rights in the invention.

BACKGROUND

Position accuracy can be quite important. Consider that, a 1 nanosecond inaccuracy in a time used to determine a position of a satellite can result in a position error of about a foot. Increasing the position accuracy can be quite difficult due to constraints on timing accuracy, as well as the complexity in orbital mechanics. Position accuracy in navigation may be achieved and maintained using measurement data. The measurement data are observations to within a certain error of the position of the entity issuing the navigation message. Prior work on increasing navigation accuracy includes smoothing (a type of averaging) the measurement data.

DETAILED DESCRIPTION

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

For a global navigation satellite system (GNSS) constellation space vehicle that directs an L-band navigation signal via a mechanically steered dish, the steering from one Area of Interest (AOI) to another AOI causes a displacement of the phase center (the reference point) of the antenna. This displacement of the phase center induces a transient error in positioning accuracy because it takes several Kalman filter updates to "learn" the new position of the phase center. This transient error causes a reduction in position accuracy for the user of the GNSS. This includes Global Positioning System (GPS) satellites that mechanically steer the L-band dish.

Embodiments provide a device, system, method, and computer-readable media that can generate an Inter-Signal Correction (ISC) that limits a size of the transient positioning error, such as to safeguard positioning accuracy of the space vehicle and the GNSS constellation. Embodiments can determine an optimal ISC associated with a steering timeline for the space vehicle antenna. A number of zero crossings for a spline ISC (or modified spline ISC) can be determined. The number of zero crossings can narrow the ISC options to membership in a specific spline family. That spline family can then be used as input to a variational/machine learning (ML) optimization and deterministic optimization techniques. The output of the optimization techniques can indicate a single spline function from the provided spline family. The single spline function from the variational and deterministic optimization techniques can be cross validated to determine the specific ISC spline instance for optimally limiting transient positioning error. The optimization can be with respect to both code power, p, and positioning error, c.

Figure 1:
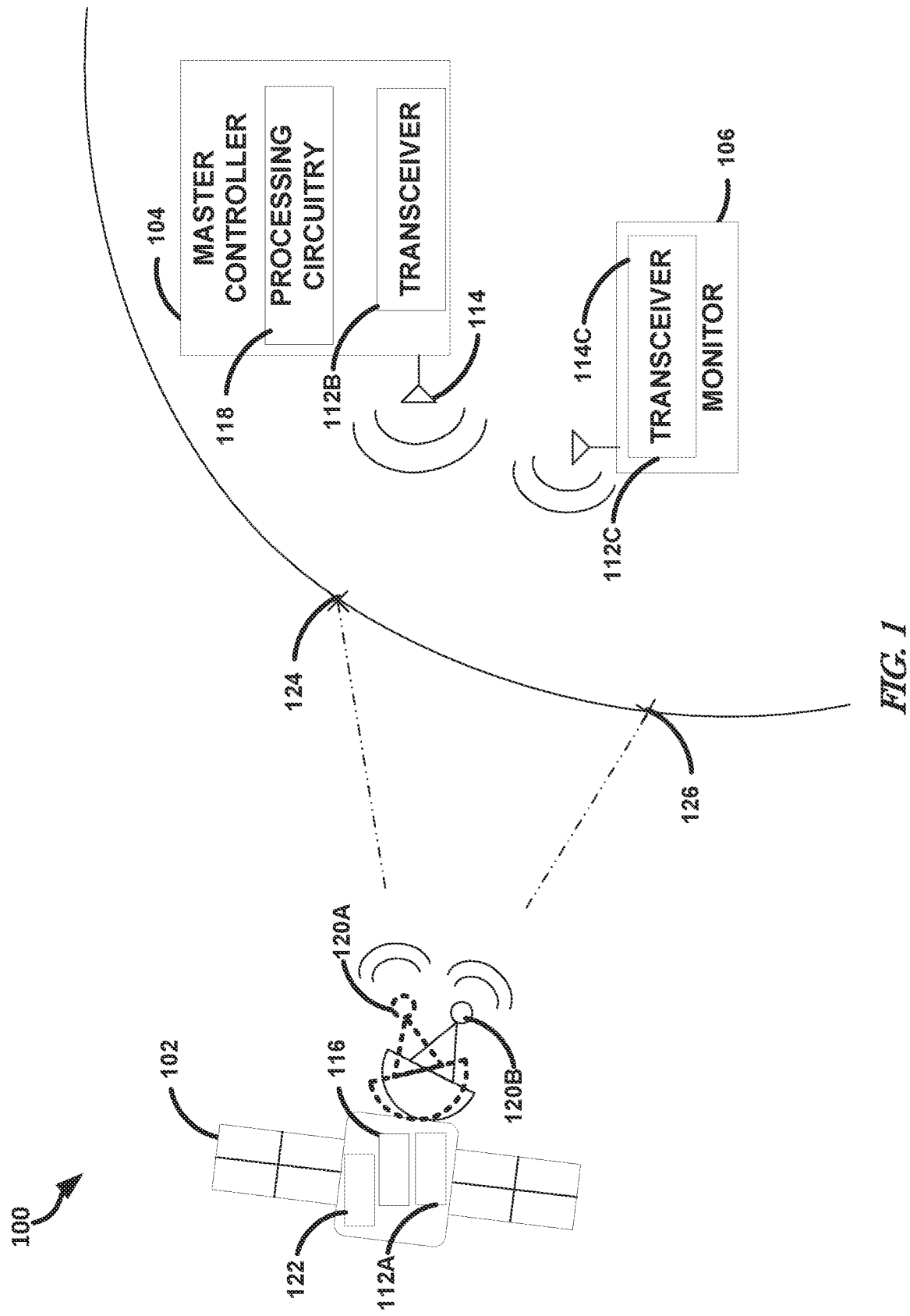
FIG. 1 illustrates, by way of example, a block diagram of an embodiment of a system that operates to determine a position of a device on a celestial body.

FIG. 1 illustrates, by way of example, an embodiment of a system 100 operates to determine a position of a device on a celestial body. The system 100 as illustrated includes a satellite 102, a master controller 104, and a monitor station 106. For accurate position determination, the satellite 102 can provide the monitor station 106 or the master controller 104 an estimate of its position. However, the satellite position is determined is a function of a reference center of an antenna 120 of the satellite 102. The reference center of the antenna 120 is subject to change as the antenna 120 can be steered to sample different targets. Using the phase center of the antenna as the reference center of the antenna provides an unambiguous positional reference for determining position based on time of arrival.

In the FIGS., a reference number with a suffix represents a specific instance or configuration of a component. For example, antenna 120A represents the antenna 120 of the satellite 102 in a first configuration and the antenna 120B represents the antenna 120 of the satellite in a second configuration. The configuration in the example of FIG. 1 includes the antenna 120A pointed at a first AOI 124 and the antenna 120B pointed at a second, different AOI 126.

The difference in the reference center between the antenna 120A and the antenna 120B can cause a transient error in the position determination of the satellite 102. This transient error in position is due, at least in part, to a lag in a Kalman filter "learning" that the reference center of the antenna 120 has changed as a result of the antenna 120 changing from pointing at the first AOI 124 to pointing at the second AOI 126.

The satellite 102 can include a communication, remote sensing (e.g., weather, electromagnetic sensing, radar, lidar, or the like), navigation (e.g., global positioning system (GPS), Galileo, or the like), internet, radio, television, manned, unmanned, or other satellite. The satellite 102 is generally any device capable of communication with the monitor 106. The satellite 102 can be orbiting the Earth, whether in low Earth orbit (LEO), medium Earth orbit (MEO), or high Earth orbit (HEO) or could be a naturally occurring celestial body external to the Earth.

The satellite 102 as illustrated includes sensor(s) 116, a transceiver 112A, and an antenna 120. The transceiver 112A is a receive and transmit radio. The transceiver 112A receives electrical signals transduced by the antenna 120.

The transceiver 112A can demodulate data from such signals. The transceiver 112A can modulate data onto electrical signals. The antenna 120 can convert the modulated electrical signals to an electromagnetic wave that is transmitted to the monitor 106. The data modulated onto the wave can include Keplerian element data, or equivalent navigational content, as determined by the sensor(s) 116, or a time as provided by a clock 120. The clock 122 of a satellite 102 is often an atomic clock with a very high time accuracy (e.g., with a maximum drift of about 2 nanoseconds a year). The sensor(s) 116 can include electro optical sensor(s) (e.g., visible, infrared (IR), or other electromagnetic radiation frequency sensor), three-axis accelerometer, gyroscope, temperature, weather, laser altimeter, lidar, radar, ranging instrument, scatterometer, sounder, radiometer, spectrometer, spectroradiometer, or the like.

Locations of satellites 102 can be determined using tracking from one or more monitors 106. The monitors 106 use mechanisms, such as radar, signal Doppler, and laser reflectors or measurement of time delay in a time-tagged signal received passively to pinpoint the position of a satellite and to maintain an understanding of its orbital elements. Given Keplerian orbital elements, or the equivalent representation of spatiotemporal position, orbital mechanics can be used to calculate where the satellite 102 is at a specific point in time, which may be instantiated by a multilateration performed by user equipment. The Keplerian elements are: epoch time that indicates the time at which the other values, inclination that indicates the angle between the equator and the orbit plane, eccentricity which is a constant defining the shape of the orbit (e.g., 0=circular, <1=elliptical), length of semi-major axis that is a constant defining the size of the orbit, true anomaly which indicates the angle between perigee and the satellite 102 (in the orbit plane), right ascension of the ascending node, the angle between vernal equinox and the point where the orbit crosses the equatorial plane (going north), and argument of perigee that indicates the angle between the ascending node and the orbit's point of closest approach to the earth (perigee). This information can be tabulated in an ephemeris (a table). Given the Keplerian elements, or the equivalent, and a time stamp from the satellite 102, the monitor 106 can calculate the position of the satellite 102 by performing multilateration.

Additionally, or alternatively, trilateration can be used by the master controller 104 to determine the position of the satellite 102. Each of the monitors 106 can each receive a communication from the satellite 102. A time between the transmission of communication at the satellite 102 and reception of the communication at the monitors 106 can indicate how far away the satellite 102 is from the monitors 106. The distance to each of the monitors 106 can be used to determine the position of the satellite 102. This technique of satellite position determination tends to be more accurate than the determination using the Keplerian elements.

The monitors 106 as illustrated include respective transceivers 112C and respective antennas 114C. The transceivers 112C modulate data to be provided to the master controller 104 and receive electrical signals from the satellite 102. The data to the master controller 104 can include a time between transmission of a communication from the satellite 102 and reception of the communication at the monitor 106. The data to the master controller 104 can further include sensor data from the sensor 116 of the satellite 102.

The master controller 104 as illustrated includes the transceiver 112B, the antenna 114B, and processing circuitry 118. The transceiver 112B demodulates electromagnetic waves from the monitors 106. The processing circuitry 118 performs operations on the received data (and other data) to determine position correction information for the satellite 102. The processing circuitry 118 can include electrical components configured to perform the operations on the received data. The processing circuitry 118 can include one or more resistors, transistors, capacitors, diodes, inductors, logic gates (e.g., AND, OR, XOR, negate, buffer, or the like), regulators (e.g., voltage, current, or power), amplifiers, power supplies, analog to digital converters, digital to analog converters, multiplexers, switches, buck or boost converters, or the like. The processing circuitry 118 can include a processing unit, such as can include one or more central processing units (CPUs), graphics processing units (GPUs), field programmable gate arrays (FPGAs), application specific integrated circuits (ASICs), or the like. Two or more of the processing units can operate in different number systems, such as in parallel.

The master controller 104 acts as a data processing center for information collected at the monitors 106. Orbit coordinates can be determined by trilateration and the orbit model (ephemeris). When the satellite drifts out of expected orbit, repositioning can be undertaken. The clock 122 may also be readjusted, but more usually information on time errors is attached to signals as correction factors. The computed corrections, time readjustments and repositioning information can be transmitted to the satellite via an uplink from the monitor 106.

Figure 2:
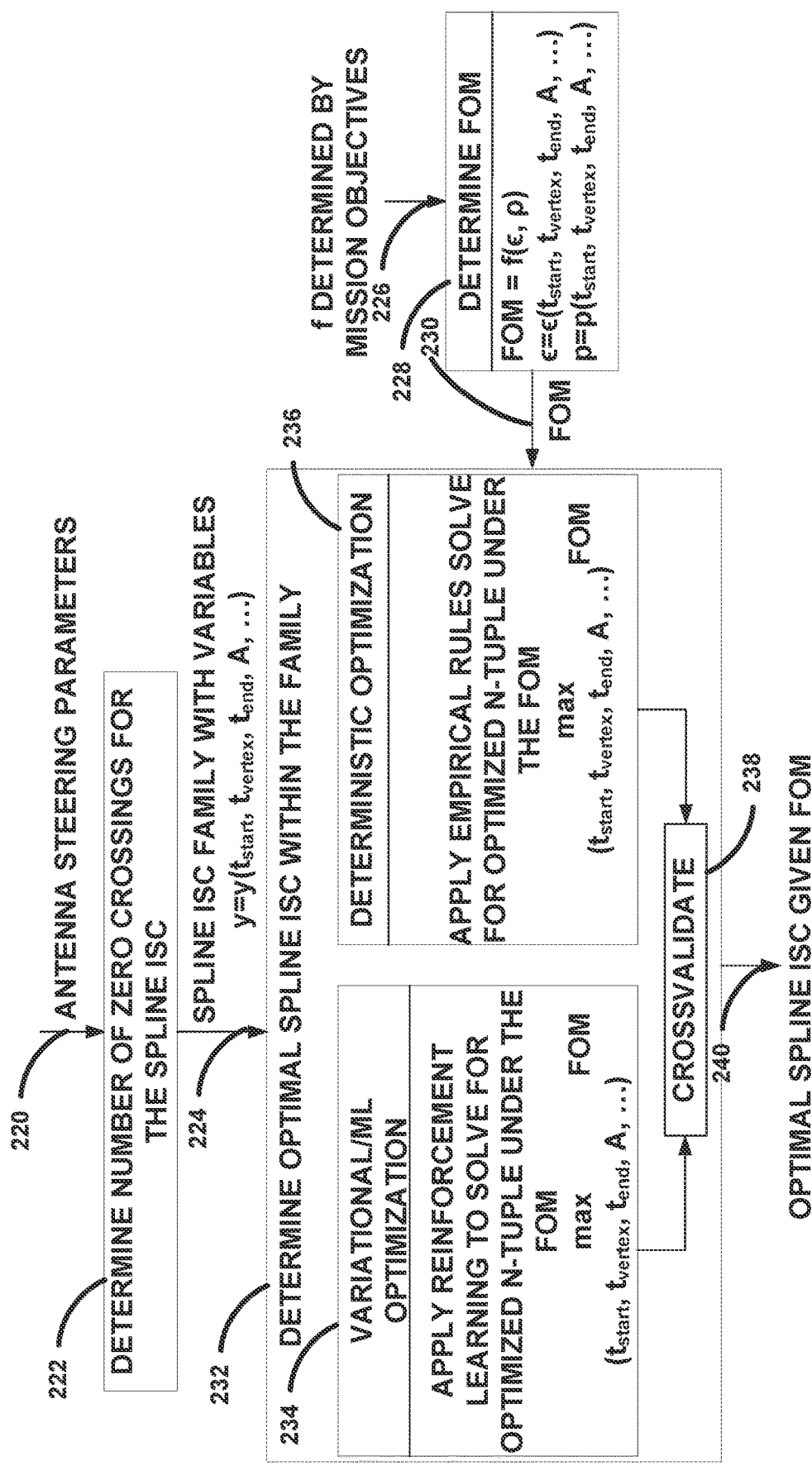
FIG. 2 illustrates, by way of example, a flow diagram of a technique for inter-signal correction (ISC) to compensate for antenna steering induced error in position determination.

FIG. 2 illustrates, by way of example, a flow diagram of a technique 200 for inter-signal correction (ISC) to compensate for antenna steering induced error in position determination. The technique 200 as illustrated includes receiving antenna steering parameters 220. The antenna steering parameters can include orientation of the antenna 120 and a corresponding time the antenna 120 is to be in the corresponding orientation. The steering parameters 220 are mission specific and can be changed prior to or during a mission.

At operation 222, a number of zero crossings for a spline ISC function can be determined (based on the antenna steering parameters 220). A zero crossing is when a function ascends from or descends to zero. A tent function linear spline has two zero crossings and one vertex. The number of zero crossings is determined from the steering parameters 220. After the number of zero crossings is determined, a spline ISC family, with the parameters of the spline function as variables 224, can be provided as input to operation 232.

A spline function is a piecewise combination of polynomials as follows:

$$\text{Spline} = \begin{cases} P_0(t), t_0 \leq t < t_1 \\ P_1(t), t_1 \leq t < t_2 \\ \ldots \\ P_{k-1}(t), t_{k-1} \leq t \leq t_k \end{cases}$$

A family of splines can be defined by variables indicating number of polynomials k, start time ($t_{start}$), end time ($t_{end}$), inflection point ($t_{vertex}$), and amplitude (A).

A figure of merit (FOM) 230 can be determined at operation 228 based on mission objectives 226. The FOM 230 can be represented by a function that is based on transient positioning error, $\epsilon$, and code power, p. The needs of the mission (defined by the mission objectives 226), can require cost balancing between power and accuracy as maximum power and accuracy may not always be possible or prudent. For example, for a beam which is wide, attenuation by being a few degrees away from beam center may only cost about ½ dB power, but may allow a smaller steering excursion in angle, thus capping transient steering error to a limit of 10 cm lower than if full steering had been performed. The FOM 230 is thus an indication of relative importance of error and code power for the given mission objectives 226 and thus allows these two exigencies to be traded and balanced. Any operation that can be performed by the satellite 102 that requires use of the antenna 120 is a valid mission objective for purposes of this disclosure.

Operation 232 determines an optimal spline ISC function 240 given the FOM 230. The operation 232 determines which spline ISC function 240 of the spline ISC family, defined by variables 224, alters data provided to a Kalman filter (implemented by the processing circuitry 118) of the master controller 104. The ISC function is a recipe for a spline ISC that limits transient positioning error of the satellite 102 as determined by the master controller 104.

The operation 232 includes two techniques for optimization of the spline ISC function that is used to alter the data provided to the Kalman filter. One technique is a variational technique 234 and another technique is a deterministic technique 236. The variational technique 234 can use reinforcement learning (RL), for example, to learn the optimal ISC spline function 240. The techniques 234, 236 can have their outputs compared at operation 238. If the outputs of the techniques 234, 236 match each other, the ISC spline function 240 is used to alter data provided to the Kalman filter. If the outputs of the techniques do not match (within a specified percentage of each other (e.g., 1%, 5%, 10%, a greater or lesser percentage, or some percentage therebetween)), the cross-validation at operation 238 can fail and the data, without ISC spline function correction, can be provided to the Kalman filter. A cross-validated solution can provide high-confidence that the ISC correction is optimal. The variational technique 234 can be implemented using one of a variety of machine learning (ML) techniques including genetic programming, swarm optimization, Monte Carlo simulation, reinforcement learning, or the like. The deterministic technique 236 can use empirical knowledge regarding when to begin a spline function, end a spline function, where the vertex of the spline should be, amplitude of the spline, etc. An example of deterministic optimization implementation is provided elsewhere.

Figure 3:
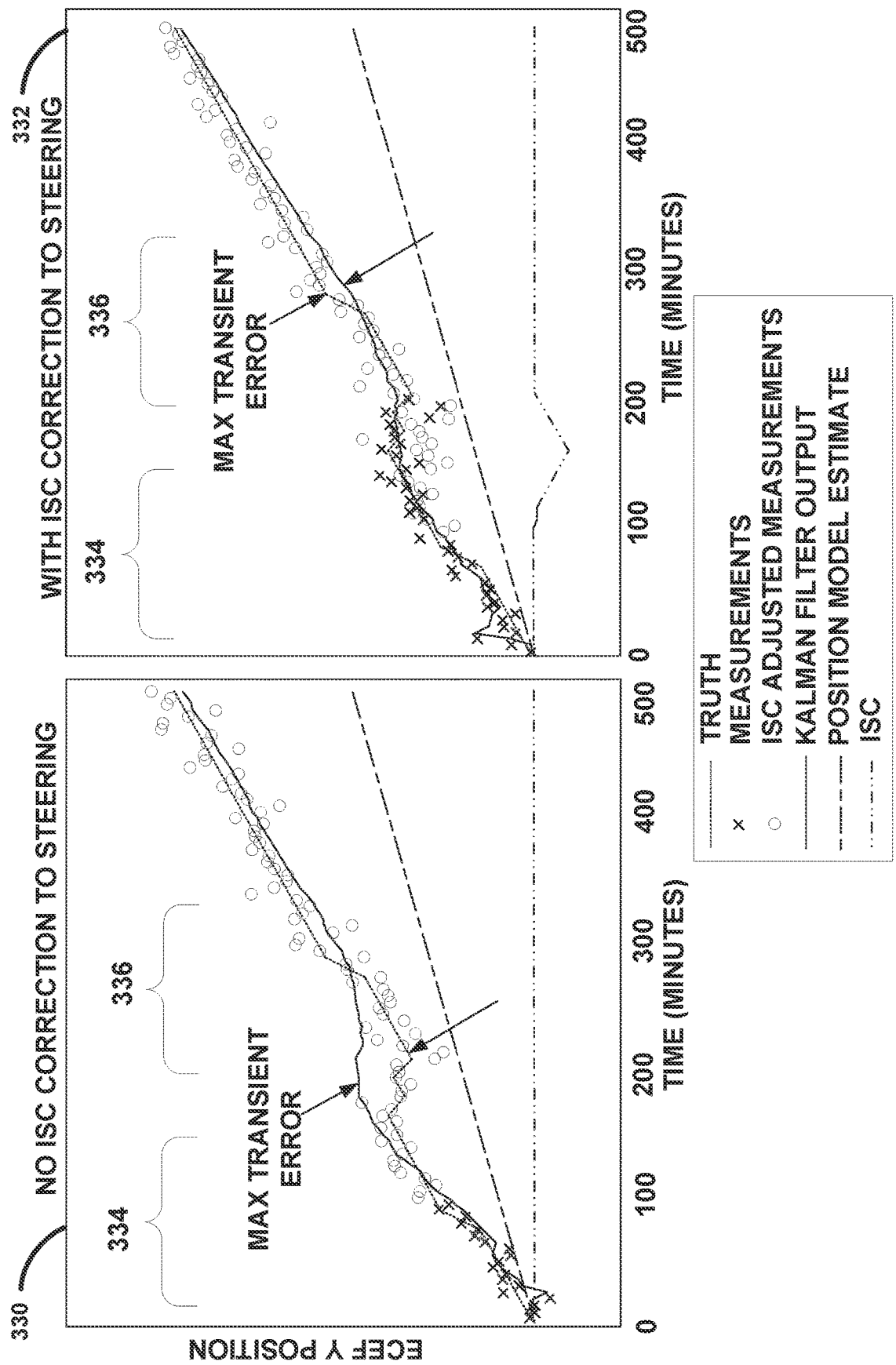
FIG. 3 illustrates, by way of example, respective graphs of satellite position determination without ISC correction to steering and with ISC correction to steering, respectively.

FIG. 3 illustrates, by way of example, respective graphs 330, 332 of satellite position determination without ISC correction to steering and with ISC correction to steering, respectively. Regions 334 and 336 regard antenna steering towards AOI1 and AOI2, respectively. A maximum transient error in the position is realized in graph 330 at about time 200 minutes. The maximum transient error with ISC correction to the steering (in the graph 332) is reduced relative to the maximum transient error of the graph 330 and occurs closer to time 300 minutes. ISC corrected measurements (sometimes called "corrected measurement data") can be determined as corrected measurement data=measurements data+ISC. Other ISCs and mathematical combinations can be used and are within the scope of embodiments.

Figure 4:
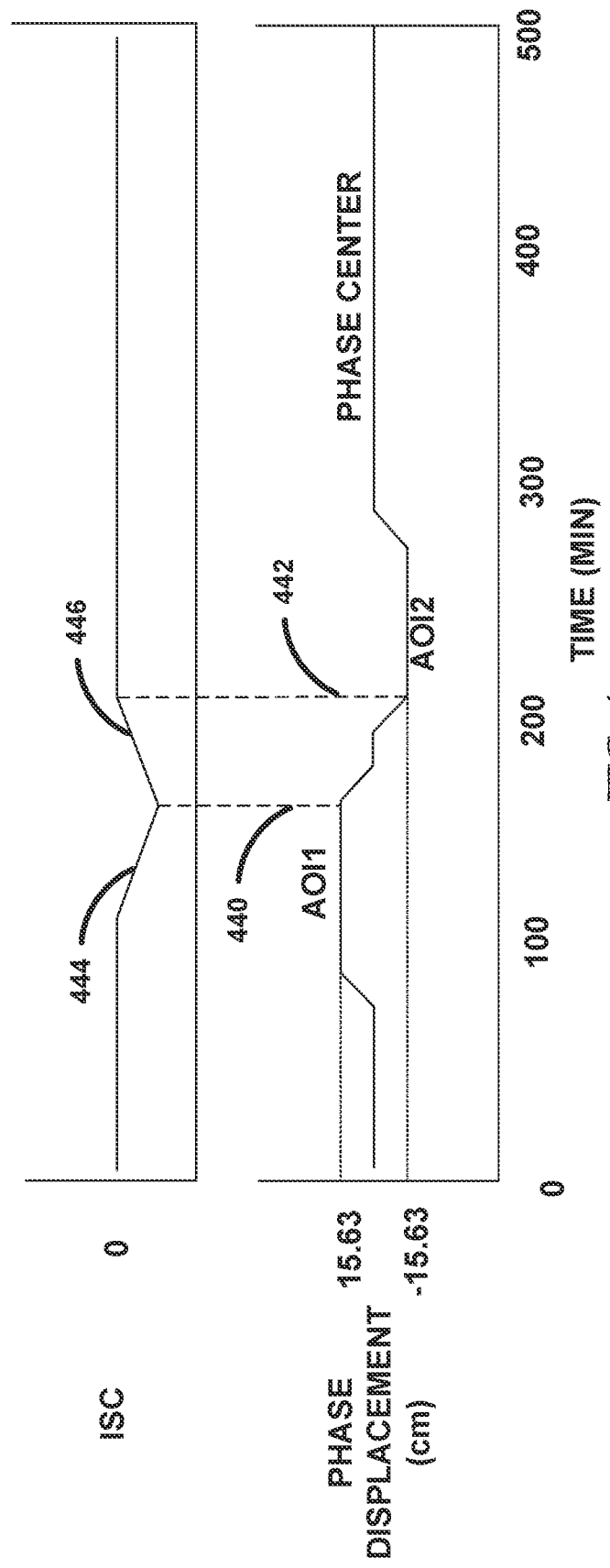
FIG. 4 illustrates, by way of example, a diagram of an embodiment of a worst-case antenna steering scenario.

FIG. 4 illustrates, by way of example, a diagram of an embodiment of a worst-case antenna steering scenario. Consider an extreme case in which antenna steering can be +/−7 degrees and in which a satellite 102 dish diameter is about 254.6 cm. This implies a worst-case phase center displacement of +/−15.63 cm. This is derived from arctan (x/254.6 cm)=7 degrees, thus x=31.26 cm, and x/2=15.63 cm. In the steering scenario illustrated in FIG. 4, the steering orientation for the AOI1 is at 15.63 cm and then the steering orientation for the AOI2 is at −15.63 cm 20 minutes after AOI1.

For the deterministic technique 236, a minimum of an ISC spline function can align in time with the antenna 120 ending its current orientation and starts moving to another orientation (e.g., moving from AOI1 to AOI2) indicated by dashed line 440. The ISC spline function can return to zero at a beginning the AOI2 orientation (when steering to the orientation corresponding to AOI2 has ended) indicated by dashed line 442. A length of a first polynomial 444 (first non-zero polynomial) of the ISC spline function can be a same as a length of a second polynomial 446 (second non-zero polynomial) of the ISC spline function. A slope of the first polynomial 444 can be opposite the slope of the second polynomial 446 (e.g., slope first polynomial=−(slope of second polynomial)). A peak amplitude of the spline function can be about 60% of a total excursion in steering from AOI1 to AOI2. That is, if the excursion in steering is 15.6 cm, the peak amplitude can be about 0.6*15.6=9.36 cm.

Figure 5:
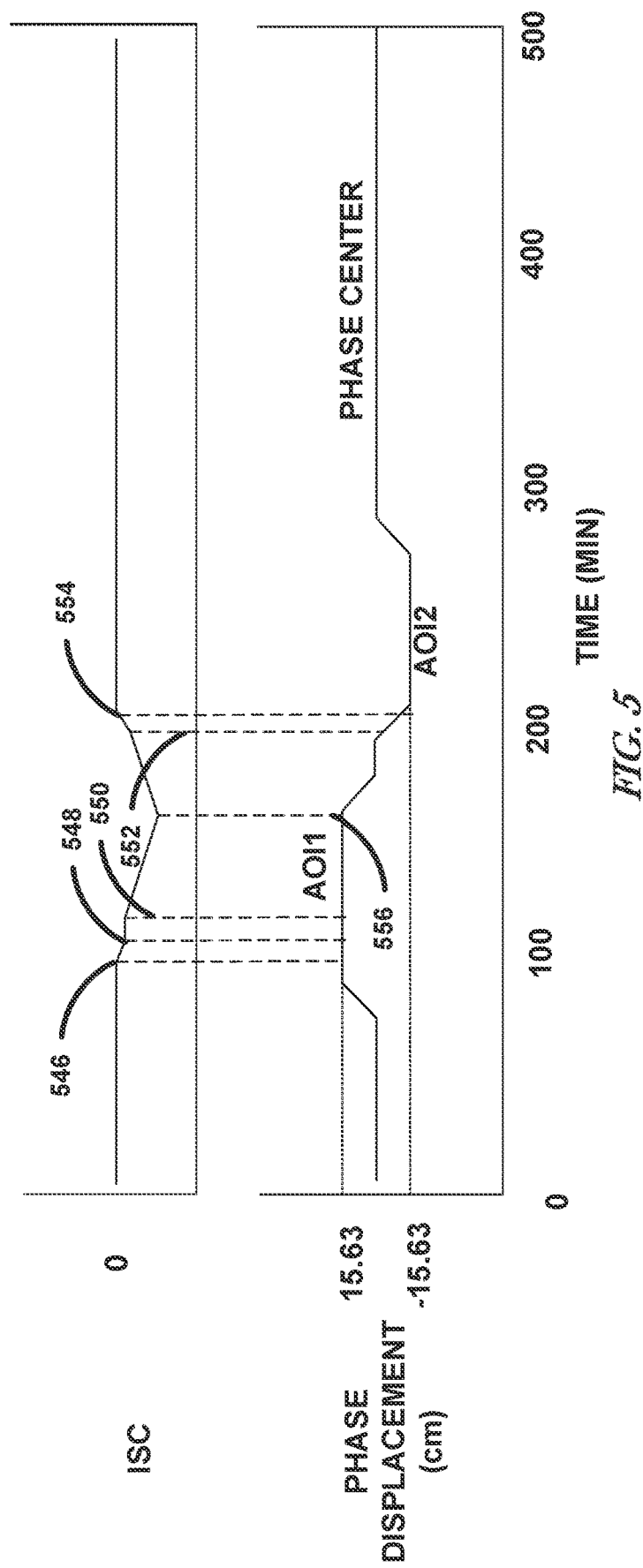
FIG. 5 illustrates, by way of example, a diagram of an embodiment of a graph of an ISC function that includes additional "fine structure" to help improve transient error.

FIG. 5 illustrates, by way of example, a diagram of an embodiment of a graph of an ISC function that includes additional "fine structure" to help improve transient error. Fine structure can be perturbations to a linear spline such that the amplitude of the perturbations is at least an order of magnitude smaller in magnitude than the primary spline. The fine structure can, compared to the ISC spline function illustrated in FIG. 4, include an earlier $t_{start}$ (indicated by dashed line 546), earlier $t_{end}$, (indicated by dashed line 554), and some additional polynomials. The additional polynomials include time between dashed lines 546 and 550. In this time, the polynomial can include a slope similar to, or same as a slope of the spline function between dashed lines 550 and 556. The slope of the spline function between dashed lines 548 and 550 can be zero and at a non-zero ISC. The vertex (indicated by dashed line 556) can occur earlier in time than the vertex of the ISC in FIG. 4. Another additional polynomial section can occur between dashed lines 552 and 554. The section between dashed lines 552 and 554 can include a slope such that absolute value of the slope of the section between dashed lines 556 and 552 is less than the absolute value of the slope of the section between dashed lines 552 and 554.

Kalman filters used for navigation can determine a weighted average of two sources of information for the location of a device: 1) measurement data based on the device's locations from monitor stations 106 and 2) data from an analytical model which attempts to predict the device's location. The Kalman gain determines this weighting. If a covariance of the measurement data is low, the Kalman filter relies, through the weighting, more on the measurement data than on the location model. Relying on the measurement data can be preferred since it can result in better position, velocity, and timing accuracy (PVTA) as compared to reliance on the model.

Figure 6:
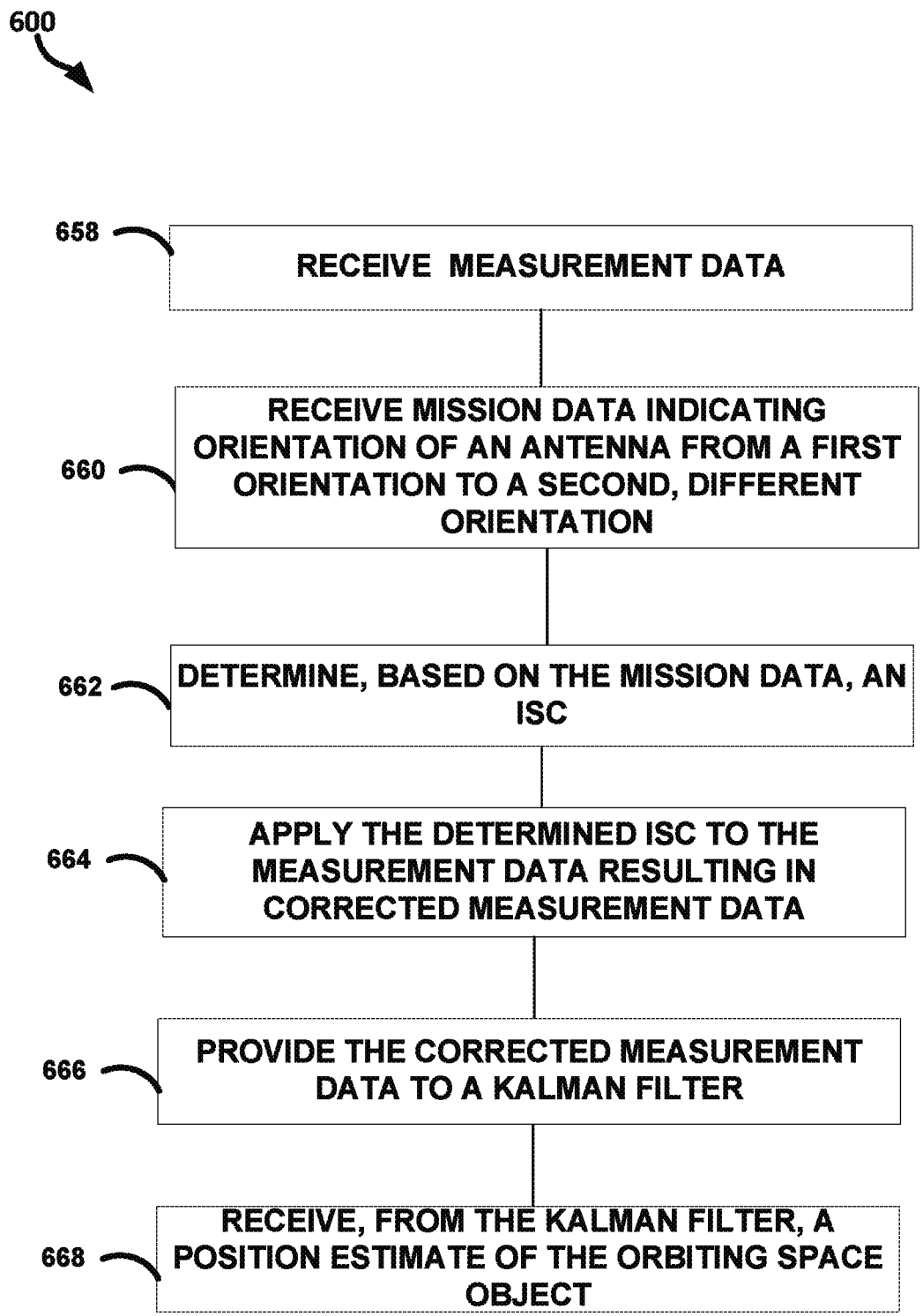
FIG. 6 illustrates, by way of example, a diagram of an embodiment of a method for improved satellite position determination.

FIG. 6 illustrates, by way of example, a diagram of an embodiment of a method 600 for improved satellite position determination. The method 600 as illustrated includes receiving (e.g., by a transceiver) measurement data, at operation 658; receiving (e.g., by processor circuitry) mission data indicating orientation of the antenna is changing from a first orientation to a second, different orientation (e.g., by a specified time), at operation 660; determining, based on the mission data, an inter-signal correction (ISC), at operation 662; applying the determined ISC to the measurement data resulting in corrected measurement data, at operation 664; providing the corrected measurement data to a Kalman filter, at operation 666; and receiving, from the Kalman filter, a position estimate of the orbiting space object, at operation 668.

The measurement data can be from a monitor device. The measurement data can be representative of a position of an orbiting space object with a mechanically moveable antenna. The method 600 can further include determining, based on the position estimate, a location of a terrestrial object. The method 600 can further include, wherein the ISC is a spline function.

The method 600 can further include, wherein the spline function includes linear sections including a (i) first linear section that begins about the time the antenna begins to move from the first orientation to the second orientation, (ii) and a second linear section, with a second slope about opposite a first slope of the first section, immediately after the first section. The method 600 can further include determining a family of ISC functions based on a number of zero crossings in orientation of the antenna required to satisfy the mission data. The method 600 can further include determining a figure of merit (FOM). The method 600 can further include identifying an ISC function of the ISC functions that optimizes a transient error of terrestrial object position in moving from the first orientation to the second orientation and based on the determined FOM. The method 600 can further include, wherein the FOM indicates a cost between code power and transient error of the measurement data.

The method 600 can further include, wherein the identifying the ISC function of the ISC functions includes using multiple techniques to determine respective ISC functions of the ISC functions. The method 600 can further include, wherein the multiple techniques include a deterministic technique and a variational technique. The method 600 can further include comparing the respective ISC functions to each other and use the ISC function only if the respective ISC functions are equal.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus (e.g., a programmable processor, a computer, or multiple computers).

A computer program may be written in any form of programming language, including compiled or interpreted languages, and it may be deployed in any form, including as a standalone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 7:
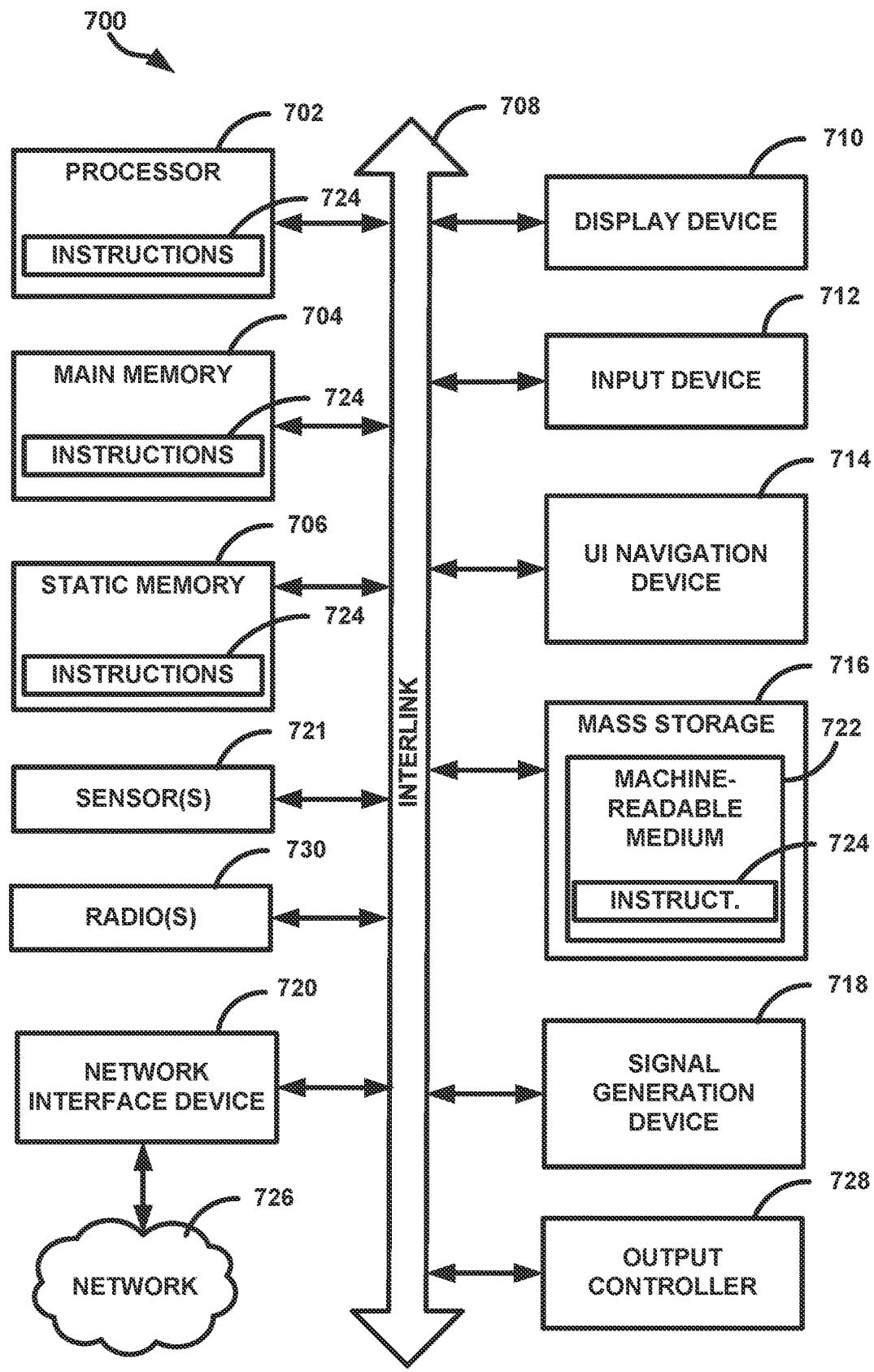
FIG. 7 illustrates, by way of example, a block diagram of an embodiment of a machine in the example form of a computer system within which instructions, for causing the machine to perform any one or more of the methodologies discussed herein, may be executed.

FIG. 7 illustrates, by way of example, a block diagram of an embodiment of a machine in the example form of a computer system 700 within which instructions, for causing the machine to perform any one or more of the methodologies discussed herein, may be executed. One or more of can be implemented or performed by the computer system 700. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, sensors 721 (e.g., a transducer that converts one form of energy (e.g., light, heat, electrical, mechanical, or other energy) to another form of energy), such as an IR, SAR, SAS, visible, or other image sensor, or the like, or a combination thereof), or the like, or a combination thereof), a main memory 704 and a static memory 706, which communicate with each other via a bus 708. The memory 704, 706 can store parameters (sometimes called weights) that define operations of the processing circuitry 118, monitor 106, or other component of the system 700. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker), a network interface device 720, and radios 730 such as Bluetooth, WWAN, WLAN, and NFC, permitting the application of security controls on such protocols.

The machine 700 as illustrated includes an output controller 728. The output controller 728 manages data flow to/from the machine 700. The output controller 728 is sometimes called a device controller, with software that directly interacts with the output controller 728 being called a device driver.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704, the static memory 706, and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks, magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL EXAMPLE

Example 1 can include a device comprising a transceiver configured to receive measurement data from a monitor device, the measurement data representative of a position of an orbiting space object with a moveable antenna, and processor circuitry configured to receive mission data indicating orientation of the antenna is changing from a first orientation to a second, different orientation by a specified time, determine, based on the mission data, an inter-signal correction (ISC), apply the determined ISC to the measurement data resulting in corrected measurement data, provide the corrected measurement data to a Kalman filter, and receive, from the Kalman filter, a position estimate of the orbiting space object.

In Example 2, Example 1 can further include, wherein the processor circuitry is further configured to determine, based on the position estimate, a location of a terrestrial object.

In Example 3, at least one of Examples 1-2 can further include, wherein the ISC is a spline function.

In Example 4, Example 3 can further include, wherein the spline function includes linear sections including a (i) first linear section that begins about the time the antenna begins to move from the first orientation to the second orientation, (ii) and a second linear section, with a second slope about opposite a first slope of the first section, immediately after the first section.

In Example 5, at least one of Examples 1-4 can further include, wherein the processor circuitry is further configured to determine a family of ISC functions based on a number of zero crossings in orientation of the antenna required to satisfy the mission data, determine a figure of merit (FOM), and identify an ISC function of the ISC functions that optimizes a transient error of terrestrial object position in moving from the first orientation to the second orientation and based on the determined FOM.

In Example 6, Example 5 can further include, wherein the FOM indicates a cost between code power and transient error of the measurement data.

In Example 7, at least one of Examples 5-6 can further include, wherein the identifying the ISC function of the ISC functions includes using multiple techniques to determine respective ISC functions of the ISC functions.

In Example 8, Example 7 can further include, wherein the multiple techniques include a deterministic technique and a variational technique.

In Example 9, at least one of Examples 7-8 can further include, wherein processor circuitry is further configured to compare the respective ISC functions to each other and use the ISC function only if the respective ISC functions are equal.

Example 10 includes a method of object location determination, the method comprising receiving, by a transceiver, measurement data from a monitor device, the measurement data representative of a position of an orbiting space object with a mechanically moveable antenna, receiving, by processor circuitry, mission data indicating orientation of the antenna is changing from a first orientation to a second, different orientation by a specified time, determining, based on the mission data, an inter-signal correction (ISC), applying the determined ISC to the measurement data resulting in corrected measurement data, providing the corrected measurement data to a Kalman filter, and receiving, from the Kalman filter, a position estimate of the orbiting space object.

In Example 11, Example 10 can further include determining, based on the position estimate, a location of a terrestrial object.

In Example 12, at least one of Examples 10-11 can further include, wherein the ISC is a spline function.

In Example 13, Example 12 can further include, wherein the spline function includes linear sections including a (i) first linear section that begins about the time the antenna begins to move from the first orientation to the second orientation, (ii) and a second linear section, with a second slope about opposite a first slope of the first section, immediately after the first section.

In Example 14, at least one of Examples 10-13 can further include determining a family of ISC functions based on a number of zero crossings in orientation of the antenna required to satisfy the mission data, determining a figure of merit (FOM), and identifying an ISC function of the ISC functions that optimizes a transient error of orbiting space object position in moving from the first orientation to the second orientation and based on the determined FOM.

In Example 15, Example 14 can further include, wherein the FOM indicates a cost between code power and transient error of the measurement data.

In Example 16, at least one of Examples 14-15 can further include, wherein the identifying the ISC function of the ISC functions includes using multiple techniques to determine respective ISC functions of the ISC functions.

In Example 17, Example 16 can further include, wherein the multiple techniques include a deterministic technique and a variational technique.

In Example 18, at least one of Examples 16-17 can further include comparing the respective ISC functions to each other and use the ISC function only if the respective ISC functions are equal.

Example 19 includes a (e.g., non-transitory) machine-readable medium including instructions that, when executed by a machine, cause the machine to perform the method of one of Examples 10-18.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. A device comprising:
a transceiver configured to receive measurement data from a monitor device, the measurement data representative of a position of an orbiting space object with a moveable antenna; and
processor circuitry configured to:
receive mission data indicating orientation of the antenna is changing from a first orientation to a second, different orientation by a specified time;
determine, based on the mission data, an inter-signal correction (ISC), wherein the ISC optimizes transient positioning error;
apply the determined ISC to the measurement data resulting in corrected measurement data;
provide the corrected measurement data to a Kalman filter; and
receive, from the Kalman filter, a position estimate of the orbiting space object.

2. The device of claim 1, wherein the processor circuitry is further configured to determine, based on the position estimate, a location of a terrestrial object.

3. The device of claim 1, wherein the ISC is a spline function.

4. The device of claim 3, wherein the spline function includes linear sections including a (i) first linear section that begins about the time the antenna begins to move from the first orientation to the second orientation, (ii) and a second linear section, with a second slope about opposite a first slope of the first section, immediately after the first section.

5. The device of claim 1, wherein the processor circuitry is further configured to:
determine a family of ISC functions based on a number of zero crossings in orientation of the antenna required to satisfy the mission data;
determine a figure of merit (FOM); and
identify an ISC function of the ISC functions that optimizes the transient positioning error of terrestrial object position determination in the antenna moving from the first orientation to the second orientation and based on the determined FOM.

6. The device of claim 5, wherein the FOM indicates a cost between code power and transient error of the measurement data.

7. The device of claim 5, wherein the identifying the ISC function of the ISC functions includes using multiple techniques to determine respective ISC functions of the ISC functions.

8. The device of claim 7, wherein the multiple techniques include a deterministic technique and a variational technique.

9. The device of claim 7, wherein processor circuitry is further configured to compare the respective ISC functions to each other and use the ISC function only if the respective ISC functions are equal.

10. A method of object location determination, the method comprising:
receiving, by a transceiver, measurement data from a monitor device, the measurement data representative of a position of an orbiting space object with a mechanically moveable antenna;
receiving, by processor circuitry, mission data indicating orientation of the antenna is changing from a first orientation to a second, different orientation by a specified time;
determining, based on the mission data, an inter-signal correction (ISC), wherein the ISC optimizes transient positioning error;
applying the determined ISC to the measurement data resulting in corrected measurement data;
providing the corrected measurement data to a Kalman filter; and
receiving, from the Kalman filter, a position estimate of the orbiting space object.

11. The method of claim 10, further comprising determining, based on the position estimate, a location of a terrestrial object.

12. The method of claim 10, wherein the ISC is a spline function.

13. The method of claim 12, wherein the spline function includes linear sections including a (i) first linear section that begins about the time the antenna begins to move from the first orientation to the second orientation, (ii) and a second linear section, with a second slope about opposite a first slope of the first section, immediately after the first section.

14. The method of claim 10, further comprising:
determining a family of ISC functions based on a number of zero crossings in orientation of the antenna required to satisfy the mission data;
determining a figure of merit (FOM); and
identifying an ISC function of the ISC functions that optimizes the transient error of terrestrial object position determination in the antenna moving from the first orientation to the second orientation and based on the determined FOM.

15. The method of claim 14, wherein the FOM indicates a cost between code power and transient error of the measurement data.

16. The method of claim 14, wherein the identifying the ISC function of the ISC functions includes using multiple techniques to determine respective ISC functions of the ISC functions.

17. The method of claim 16, wherein the multiple techniques include a deterministic technique and a variational technique.

18. The method of claim 16, further comprising comparing the respective ISC functions to each other and use the ISC function only if the respective ISC functions are equal.

19. A non-transitory machine-readable medium including instructions that, when executed by a machine, cause the machine to perform operations of object location determination, the operations comprising:
receiving measurement data from a monitor device, the measurement data representative of a position of an orbiting space object with a mechanically moveable antenna;
receiving mission data indicating orientation of the antenna is changing from a first orientation to a second, different orientation by a specified time;
determining, based on the mission data, an inter-signal correction (ISC), wherein the ISC optimizes transient positioning error;

applying the determined ISC to the measurement data resulting in corrected measurement data;
providing the corrected measurement data to a Kalman filter; and
receiving, from the Kalman filter, a position estimate of the orbiting space object.

20. The non-transitory machine-readable medium of claim 19, wherein the operations further comprise determining, based on the position estimate, a location of a terrestrial object.

* * * * *